United States Patent

[11] 3,592,966

[72] Inventor Richard C. Hansen
Penfield, N.Y.
[21] Appl. No. 804,880
[22] Filed Mar. 6, 1969
[45] Patented July 13, 1971
[73] Assignee Xerox Corporation
Rochester, N.Y.

[54] ACOUSTICAL COUPLING APPARATUS
3 Claims, 3 Drawing Figs.

[52] U.S. Cl. ........ 179/1 C
[51] Int. Cl. ........ H04m 11/00
[50] Field of Search ........ 179/1 C, 2 C, 146

[56] References Cited

UNITED STATES PATENTS 2,547,420 4/1951 Sumner ........ 179/146
2,847,506 8/1958 Gray et al. ........ 179/1
3,436,474 4/1969 Saeger et al. ........ 178/7.1
3,449,522 6/1969 Crane et al. ........ 179/1

*Primary Examiner*—Kathleen H. Claffy
*Assistant Examiner*—Douglas W. Olms
*Attorneys*—Paul M. Enlow, Ronald Zibelli, James J. Ralabate, Norman E. Scharder and Terry J. Anderson ABSTRACT: Apparatus for acoustically coupling facsimile signals through a telephone handset to a telephone network. A loading arm engageable with the telephone handset biases the telephone speaker into intimate relationship with a receive transducer adapted to convert acoustical signals into electrical signals. A send transducer for converting electrical signals into acoustical signals is biased into intimate relationship with the telephone microphone by means of a resiliently deflectable support adapted to assume variable orientation with respect to the receive transducer and the telephone speaker.

INVENTOR.
RICHARD C. HANSEN
BY Terry J. Anderson
ATTORNEY

ACOUSTICAL COUPLING APPARATUS

BACKGROUND OF THE INVENTION

This invention relates generally to coupling or connector devices and more particularly to apparatus for coupling or connecting data signals to a standard telephone network.

In the art of facsimile, data signals representative of recorded graphic information at a first location may be transmitted to a second location remote from the first location by wire or radio for reproducing an exact copy of the original graphic information at the second location. In a typical facsimile system, documents for example, which are to be transmitted are scanned at a transmitting station to convert the information contained thereon into a series of electrical or video signals. These video signals are then coupled to the input of a communication link or transmitting medium which interconnects the transmitter with a receiver. At the receiving station, the electrical or video signals in conjunction with suitable synchronizing signals selectively control the actuation of a recording means whereby to generate a facsimile of the transmitted information.

The standard telephone networks have provided an attractive means for transmitting graphic information from one location to another for the reasons that telephone networks exist worldwide, have extensive subscriber service, are available at a relatively low cost, and no other transmission medium need be installed. Accordingly, telephone networks have served as a suitable medium for transmitting the electrical or video signals from a first location to a second location.

In the absence of a suitable interface between a facsimile apparatus and the telephone facilities, it has heretofore been necessary to electrically connect the data signals with the telephone circuits in order to satisfactorily transmit and receive the electrical or video signals over telephone lines. Obviously, such arrangement has therefore required special adaptations and has not extended the transmission medium to the maximum number of subscribers.

Accordingly, various attempts have been made to provide devices which permit transmitting and receiving data signals via the telephone handset normally associated with the telephone networks at all subscribing locations. That is, information which is to be transmitted through the telephone network is introduced into the network via the microphone located at the end of the telephone handset in which one speaks during an ordinary telephone conversation. In a similar manner, data signals may be received from the telephone network via the speaker located at the other end of the telephone handset in which one hears the voice of a second party during a normal telephone conversation.

In such arrangements employing facsimile devices, the electrical or video signals to be transmitted must be converted into acoustical signals by means of a suitable electrical-acoustical transducer, which acoustical signals are then picked up by the microphone associated with the telephone handset and transmitted to a receiving location. At the receiving location, the acoustical signals are received by a similar electrical-acoustical transducer from the speaker normally associated with the telephone handset and are reconverted to electrical or video signals for generating a facsimile of the particular information. Such type of connection has been aptly referred to as acoustical coupling of facsimile signals.

For various reasons, prior acoustical coupling devices have not proven wholly satisfactory. For example, such devices have not provided an interface between the facsimile device and the telephone handset which effectively insulates against ambient acoustical energy and hence have caused a degradation of the quality in the transmitted and received signals. In addition, prior acoustical coupling devices have not been readily adaptable to accommodate all of the telephone handsets presently in use. That is, the telephone terminal equipment presently in use is derived from several sources of manufacture and hence the specifications and design configurations thereof vary between the respective manufacturers. Moreover, prior acoustical coupling devices have required laborious adjustments in the coupling apparatus to insure proper positioning of the handset with respect to the coupling devices. Furthermore, such prior coupling devices have been lacking in an arrangement by which the telephone handset can easily be inserted into the coupling arrangement with a minimum of operator ease, while at the same time insuring that the handset will remain in the optimum mating position throughout the duration of transmission without constant operator attention.

SUMMARY OF THE INVENTION

Accordingly, it is an object of the present invention to couple data signals to a standard telephone network.

It is another object of the present invention to provide a coupling arrangement through which facsimile signals may be transmitted and received over a standard telephone network.

It is another object of the present invention to provide a coupling arrangement for transmitting and receiving facsimile signals through the handset of a standard telephone.

It is still another object of the present invention to provide an arrangement by which facsimile signals are acoustically coupled through a standard telephone handset to a telephone network, which coupling arrangement provides an effective insulation against ambient acoustical energy.

It is yet another object of the present invention to provide an arrangement for effectively coupling facsimile signals through telephone handsets of varying specifications and design configurations.

It is still a further object of the present invention to provide an arrangement for coupling facsimile signals with a telephone network through the handset at various telephone subscriber locations which coupling arrangement provides a minimum of operator skill and a maximum of operator ease in making such connection.

It is yet a further object of the present invention to provide an acoustical coupling device for transmitting and receiving facsimile signals through a telephone handset on a standard telephone network which coupling device adjustably receives handsets of various dimensional configurations with a maximum of operator ease.

These and other objects of the invention are attained by means of a first transducing member for converting acoustical signals into electrical signals, a second transducing member for converting electrical signals into acoustical signals, means for supporting the receive or speaker portion of a telephone handset in intimate relationship with the first transducing member, and means operatively associated with said second transducing member for supporting the second transducing member in intimate relationship with the transmit or microphone portion of a telephone handset when the receive portion of the telephone handset is operatively positioned in intimate relationship with the first transducing member.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 1:
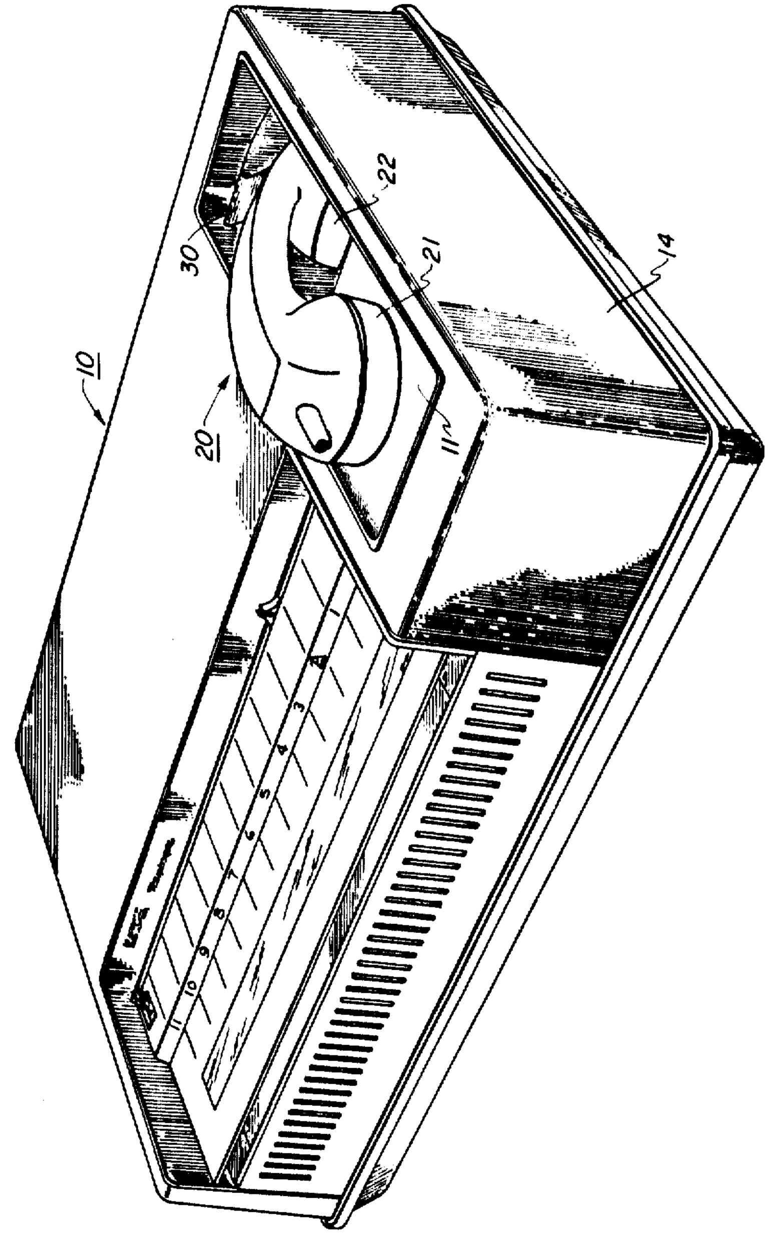
FIG. 1 is a perspective view of a facsimile machine with which the apparatus according to the present invention is particularly adapted for use.

Referring to FIG. 1 of the drawings, the coupling arrangement as contemplated by the present invention is particularly adapted for use in conjunction with a facsimile transceiver 10.

While the coupling arrangement will be described in conjunction with a facsimile system, it is to be understood that the present invention is readily adaptable for coupling various data signals to or from a telephone network. According to a preferred embodiment, facsimile transceiver 10 is of the type designed to operate in the half duplex mode. That is, although the transceiver unit is designed to function both as a transmitter and a receiver, the transmitter and receiver are not capable of simultaneous operation. As may be seen from Figure 1, the apparatus which couples the facsimile device to a telephone transmission network is located at the right-hand portion of the transceiver 10.

Figure 2:
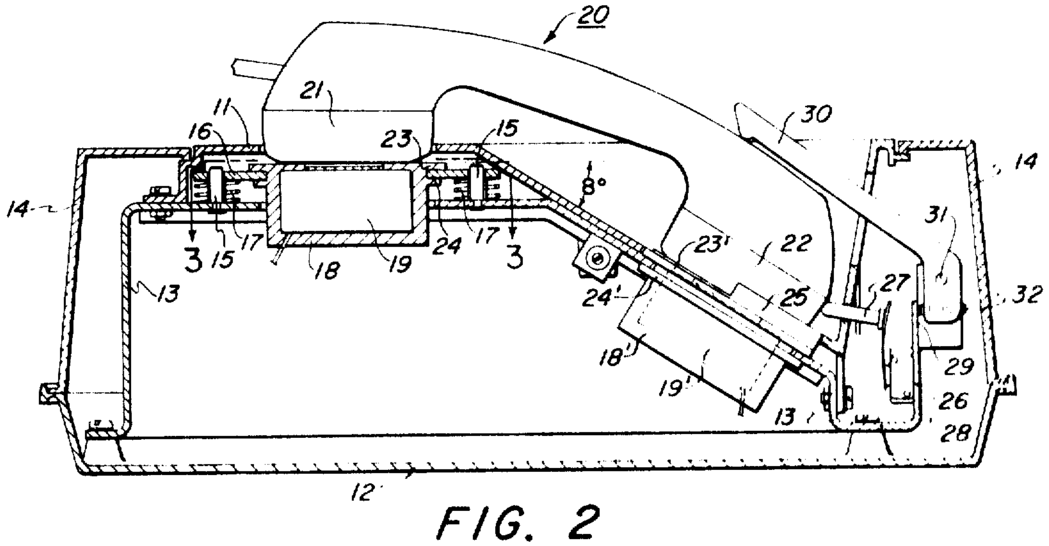
FIG. 2 is a partly broken away sectional view showing the apparatus according to the present invention.

As may be seen from FIG. 2, transceiver 10 includes a lower base enclosure member 12 to which the major components of the transceiver apparatus are attached. A support member or plate 13 is connected to base enclosure member 12 by means of screws or other suitable fastening means. Support member 13 includes a first portion disposed horizontally within the enclosure of transceiver 10 and a second portion which is inclined at an angle to the horizontal, extending from base enclosure member 12 upwardly within transceiver 10. The angle of inclination from horizontal of the inclined portion of support member 13 approximates the angle formed between the respective faces of the microphone portion 21 and the speaker portion 22 of a telephone handset 20 but as will be presently understood the approximation of this angle as a result of the instant arrangement is inconsequential.

Acoustical-electrical transducers 19 and 19′ which are adapted to convert electrical signals into acoustical signals and acoustical signals into electrical signals, respectively, are of a type which are commercially available and are generally well known. Acoustical-electrical transducers 19 and 19′ are supported within transducer boots 18 and 18′, respectively, which are of a generally hollow, cylindrical construction and include at one end thereof openings through which acoustical signals may be readily passed. Transducer boots 18 and 18′ at the other end thereof include suitably arranged openings through which transducers 19 are operatively connected to the electrical circuitry of transceiver 10. Transducer boots 18 and 18′ being constructed from a resilient, shock absorbing, acoustically insulating, slightly deformable material provide an environment for transducers 19 which is substantially unaffected by ambient conditions. Transducer boots 18 and 18′ also include a pair of axially spaced flanges 23 and 24 and 23′ and 24′, respectively, which extend circumferentially thereabout to form a mounting arrangement for boots 18 and 18′ and hence transducers 19 and 19′ which are supported therein.

The first transducer 19′ which may be designated as a receive transducer, and the associated transducer boot 18′ are supported through a suitably arranged opening in the inclined portion of support plate 13 by means of the flanges 23′ and 24′ of boot 18′. The second transducer 19, which may be designated as a send transducer, and the associated transducer boot 18 are supported through a suitably arranged aperture in floating transducer support plate 16 by means of the flanges 23 and 24 of boot 18.

Figure 3:
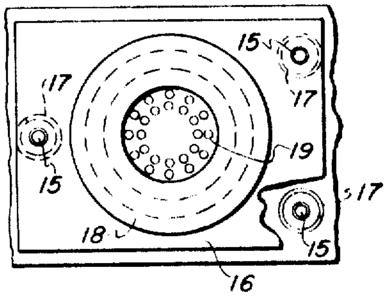
FIG. 3 is a sectional view taken along the lines 3–3 of FIG. 2.

As may be seen from FIGS. 2 and 3, a plurality of guide pins 15 are connected to the horizontal portion of support member 13. The floating transducer support plate 16 is situated above support member 13 and includes a plurality of apertures in plate 16 which are suitably arranged to align with guide pins 15. Send transducer 19 and associated transducer boot 18, supported by floating transducer support plate 16 centrally of guide pins 15, also extends centrally within a suitably arranged opening in the horizontal portion of support member 13 below floating support plate 16. This arrangement permits transducer support plate 16, transducer boot 18 and send transducer 19 to assume a widely variable orientation with respect to support member 13 and receive transducer 19 supported thereon. A plurality of compression springs 17 are positioned on guide pins 15 between support member 13 and floating transducer support plate 16 to normally bias floating transducer support plate 16, transducer boot 18, and send transducer 19 upwardly as viewed in FIG. 2.

A faceplate 11 having suitably arranged openings therein which permit access to the respective transducers 19 and 19′, is positioned over support member 13 and floating plate 16 and is connected to support member 13 by means of bolts or other suitable fastening means. The openings in faceplate 11 are positioned to coincide with the positioning of the respective transducers 19 and 19′ and are of a diameter which will respectively, admit the microphone and speaker portions of a telephone handset 20. Upper enclosure member 14 of the transceiver apparatus 10 includes a suitably arranged opening corresponding to the outer dimensions of faceplate 11 which when in position completes the enclosure of both the transceiver components and the coupler components as may be seen from FIG. 1.

A loading arm 30 is pivotally connected to a support member 28 extending from base member 12 by means of pivot pin 31. An adjusting screw 32 in the lower portion of loading arm 30 is engageac'e with a face 29 on support member 28 to adjustably limit the rotative positioning of loading arm 30 about pivot pin 31 in the clockwise direction as viewed in FIG. 2. As may be seen from FIGS. 1 and 2, the upper portion of loading arm 30 extends through a suitably arranged aperture in the back portion of faceplate 11. Loading arm 30 in the preferred arrangement is constructed from a resilient material which permits arm 30 to be deflected along the length thereof in opposition to adjusting screw 32. Thus arm 30 performs as a cantilevered spring against telephone handset 20 as will hereinafter be more fully described.

As may also be seen from FIG. 2, a switch actuator member 27 extends through the back portion of faceplate 11 below loading arm 30. Switch actuator member 27 is operatively engageable with a switch 26 connected to support member 28. Switch 26 is operatively connected to the electrical circuitry of transceiver 10 to provide an interlock arrangement which insures that a telephone handset 20 is properly positioned on the coupling apparatus. A stop member 25 connected to faceplate 11 at the lower right-hand portion thereof as seen in FIG. 2, encircles a portion of receive transducer boot 18′ to aid in the alignment and positioning of telephone handset 20 in relation to the respectively associated transducer 19.

A telephone handset 20 having a receive or speaker portion 22 at one end thereof and a transmit or microphone portion 21 at the other end thereof is placed into the coupling arrangement by inserting the receive portion 22 along the incline of faceplate 11 between loading arm 30 and transducer boot 18′. Adjusting screw 32 on loading arm 30 is initially adjusted to provide a tension of loading arm 30 against telephone handset 20 thus biasing the speaker portion 22 into intimate contact with the portion of transducer boot 18′ overlying the face of receive transducer 19′ under the spring action of arm 30. The tension exerted by loading arm 30 against telephone handset 20 when properly adjusted by adjusting screw 32 is sufficient to slightly deform the portion of transducer boot 18′ overlying the face of receive transducer 19′ against the face of speaker portion 22 to form an acoustical seal between telephone speaker 22 and transducer 19′ and hence insulate against ambient acoustical energies.

The telephone handset 20 is thus inserted between loading arm 30 and transducer 19′ until the outer periphery of receive portion 22 engages the stop member 25. In this position, receive portion 22 also engages switch actuator 27 which in turn activates switch 26 to provide a suitable electrical signal to the facsimile system indicating that the telephone handset 20 is in proper operating position on the coupling apparatus.

With the telephone handset 20 in proper operating position on the coupling apparatus, the floating transducer support plate 16 will be deflected downwardly as viewed in FIG. 2 under the influence of loading arm 30 against the action of springs 17 and the microphone portion 21 of telephone handset 20 will be biased against the portion of transducer boot 18 overlying the face of send transducer 19. This deflection of support plate 16 is a result of the tension exerted by loading arm 30 against telephone handset 20. Because of the floating arrangement of transducer support plate 16 on guide pins 15, the portion of transducer boot 18 overlying the face of send transducer 19 is free to conform to the particular orientation of the face of microphone portion 21 irrespective of the orientation of speaker portion 22. Because the angle of disposition between microphones 21 and speakers 22 may vary between the respective manufacturers of telephone equipment, it is essential that the coupling apparatus compensate for these variations. Accordingly, transducer support plate 16 which associated transducer boot 18 and send transducer 19 is free to assume variable orientation with respect to receive transducer 19' and hence provides an effective coupling arrangement for most of the telephone handsets presently in use.

As transducer support plate 16 is biased upwardly as viewed in FIG. 2 under the influence of springs 17, the portion of transducer boot 18 overlying the face of send transducer 19 is pressed firmly against the face of telephone microphone 21. Because telephone handset 20 is positioned firmly on the receive transducer 19 under the influence of loading arm 30, springs 17 slightly deform the portion of transducer boot 18 overlying the face of send transducer 19 against the face of telephone microphone 21 to form an acoustical seal between send transducer 19 and telephone speaker 21 which seal effectively insulates against ambient acoustical energies.

With the telephone handset 20 in proper operating position on the coupling apparatus, information may be either transmitted or received, depending on the mode of operation selected, over a standard telephone network through the telephone handset. As is now apparent, this arrangement therefore provides an effective means by which a facsimile transceiver can be acoustically coupled through various types and designs of telephone handsets to a telephone network with maximum operator ease.

After a transmission or receiving operation has been completed the telephone handset may then be removed from the coupling apparatus by lifting the handset at the transmit end 21 and sliding the receive end 22 from between loading arm 30 and receive transducer 19.

While the invention has been described with reference to a preferred embodiment, it will be understood by those skilled in the art that various changes may be made and equivalents may be substituted for elements thereof without departing from the true spirit and scope of the invention.

What I claim is:

1. Apparatus for coupling a facsimile transceiver to a telephone network through a telephone handset having speaker and microphone portions comprising:
   - first transducer means for converting acoustical signals from said telephone handset into electrical signals,
   - second transducer means for converting electrical signals from a facsimile transceiver into acoustical signals,
   - a first support member for mounting said first transducer means,
   - a second support member for mounting said second transducer means,
   - a support plate having a plurality of apertures for supporting said second support member, and
   - a plurality of guide members affixed to a third support member and each having a resilient means positioned thereon, said guide members being positioned through the associated support plate aperture, the arrangement of said support plate on said guide members permitting said second support member to conform to the orientation of said microphone portion irrespective of the orientation of said speaker portion.

2. The coupling apparatus as defined in claim 1 further including a loading arm pivotally connected to a fourth support member extending from a base member for engagement with said telephone headset, said loading arm being deflectable along the length of said handset to apply tension thereto, thereby biasing said speaker portion toward said first transducer means and said microphone portion toward said second transducer means.

3. The coupling apparatus as defined in claim 2 wherein said first and second support members each include an acoustically insulating, deformable material overlying the outer periphery of the operative faces of said transducer means, the tension exerted by said loading arm against said telephone handset being sufficient to slightly deform said insulating material against the face of said speaker and microphone portions to insulate said first and second transducer means and said speaker and microphone portions, respectively, from ambient acoustical energies, said tension exerted by said loading arm further being sufficient to permit said second support member to conform to the orientation of said microphone portion irrespective of the orientation of said speaker portion.